March 11, 1952 A. V. L. C. DEBRIE 2,588,490
DRIVING MECHANISM FOR SOUND PICTURE SYSTEMS
Filed May 14, 1948 2 SHEETS—SHEET 1

March 11, 1952   A. V. L. C. DEBRIE   2,588,490
DRIVING MECHANISM FOR SOUND PICTURE SYSTEMS
Filed May 14, 1948   2 SHEETS—SHEET 2
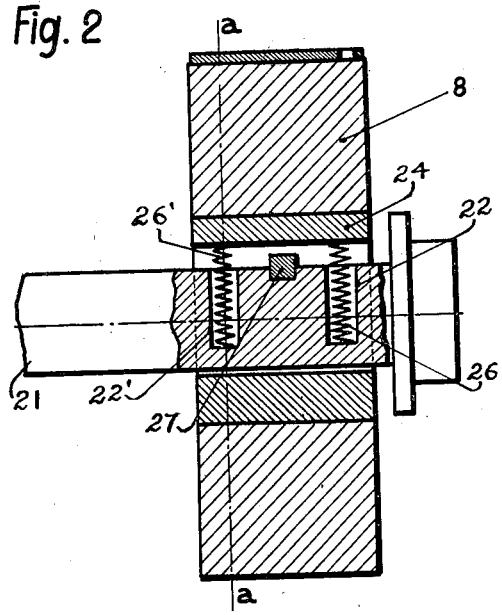
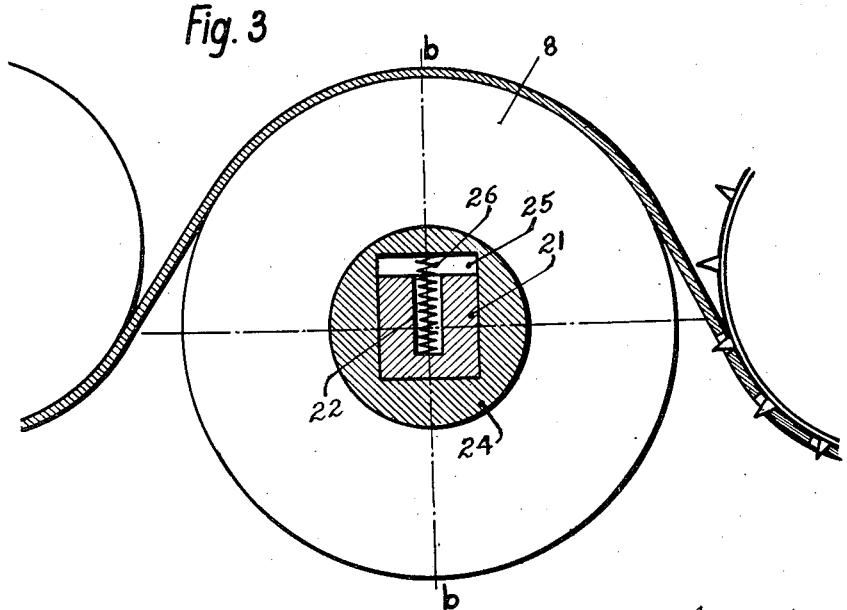

Patented Mar. 11, 1952

2,588,490

UNITED STATES PATENT OFFICE 2,588,490

DRIVING MECHANISM FOR SOUND PICTURE SYSTEMS

André Victor Léon Clément Debrie, Paris, France

Application May 14, 1948, Serial No. 26,985
In France July 15, 1942

Section 1, Public Law 690, August 8, 1946
Patent expires July 15, 1962

4 Claims. (Cl. 271—2.3)

The present invention relates to the film driving mechanisms for sound picture systems wherein a pressure roller is located between the sprocket which drives the film, and the drum around which the film passes in front of the luminous spot.

It is necessary for the film to adhere perfectly to the drum also when the transverse section of the film is not perfectly horizontal, what happens by example when one of the edges of the film is shorter than the other one.

In order to obtain this result I provide a pressure roller acting on a loop of the film and able to yield angularly in a plane perpendicular to the direction of the film: this makes up not only for the variations in the total length of the film but also for the undulations due to the differences in length between the two edges of the film and the film bears therefore in a perfect manner against the drum.

In particular the roller may be mounted on two springs arranged in the direction of the width of the film inside recesses of the shaft of said roller. It is apparent that under such conditions the latter may not only rise and sink in a direction perpendicular to its axis, but also rock angularly with reference to said axis.

In the drawings which relate to an embodiment of the present invention:

Fig. 2 is a side view, partly in axial cross section taken on line b—b of Fig. 3, of the pressure roller.

Fig. 3 is an end view, partly in cross section taken on line a—a of Fig. 2 of said presure roller.

Figure 1:
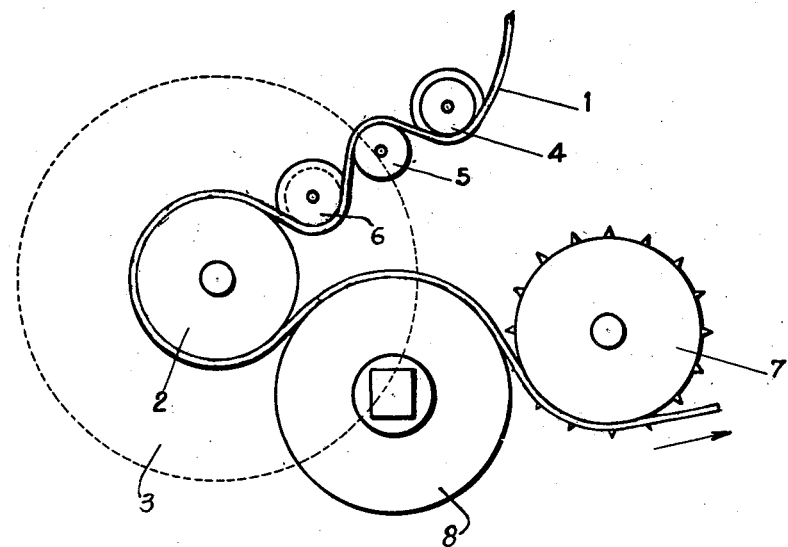
Fig. 1 shows diagrammatically a side elevation of the film driving mechanism.

It is apparent (Fig. 1) that the film 1 passes over the drum 2 the rotation of which is regularized by the fly wheel 3 after it has passed over the rollers 4, 5, 6. The film 1 is driven in the direction of the arrow under the action of the sprocket 7. Between the drum 2 and the sprocket 7 is located the pressure roller 8.

In Figs. 2 and 3, the stationary shaft 21 which shows in front of the bearing for the pressure roller 8 a square-shaped cross-section, is provided with two recesses 22—22' arranged side by side longitudinally of the shaft. The roller 8 is rotatively mounted on a ring 24 which has a rectangular bore 25 for engaging with a slightly vertical play the square-shaped part of the shaft 21; two springs 26—26' entering respectively the recesses 22—22' are inserted between the shaft 21 and the ring 24. Between the two recesses 22—22' the square-shaped part of the shaft 21 carries a yielding stop 27; said stop projecting over the axis 21 is adapted to come into contact with the ring 24 when the springs 22—22' are compressed under the action of the pressure of the film 1 on the roller 8. This stop may be constituted advantageously by a very short blade spring the sag of which is very small whereby it is possible to obtain an accuracy in the equilibrium which cannot be obtained with a helical spring or with a rubber stop.

It is apparent, under such conditions, that when one of the sides of the film is longer than the other and consequently the cross-section of the film is at a certain angle with the horizontal, the roller the pressure of which is exerted differently on the two springs supporting it, assumes the same angle and constrains the film to bear throughout its length on the reading drum.

What I claim is:

1. In a sound picture film driving mechanism comprising a driving sprocket, a drum around which the film passes and the axis of rotation of which is parallel to the axis of rotation of said driving sprocket and a pressure roller located between said sprocket and said drum and urged against the film and means mounting the pressure roller for movement in a plane perpendicular to the longitudinal direction of the film whereby the generating lines of the cylinder forming the periphery of said pressure roller may take an angular inclination with respect to the axis of rotation of said driving sprocket and of said drum only in the plane defined by said mounting means.

2. In a sound picture film driving mechanism comprising a driving sprocket, a drum around which the film passes and the axis of rotation of which is parallel to the axis of rotation of said driving sprocket and a pressure roller located between said sprocket and said drum, a fixed part parallel to the axes of rotation of said driving sprocket and said drum rotatively supporting said pressure roller, a non-rotatively mounted ring surrounding said fixed part and a plurality of springs interposed between said fixed part and the cylindrical surface of the roller and located parallel along a line parallel to the axes of rotation of said driving sprocket and said drum and urging said cylindrical surface against the film.

3. In a sound picture film driving mechanism comprising a driving sprocket, a drum around which the film passes and the axis of rotation of which is parallel to the axis of rotation of said driving sprocket and a pressure roller located between said sprocket and said drum, a fixed shaft parallel to the axes of rotation of said driving sprocket and said drum having recesses rotatively supporting said pressure roller, a ring surrounding said fixed shaft and non-rotatively mounted with reference to said shaft, a plurality of springs mounted parallel in said recesses in the direction of the length of said fixed shaft, said springs being interposed between said fixed shaft and said ring, and a cylindrical part rotatably mounted around said ring.

4. A sound picture film driving mechanism comprising a driving sprocket, a drum around which the film passes and the axis of rotation of which is parallel to the axis of rotation of said driving sprocket and a pressure roller located between said sprocket and said drum, a fixed shaft parallel to the axes of rotation of said driving sprocket and said drum having recesses rotatively supporting said pressure roller, a ring surrounding said fixed shaft and non-rotatively mounted with reference to said shaft, two springs mounted parallel to one another in said recesses in the direction of the length of said fixed shaft, said springs being interposed between said fixed shaft and said ring, a yielding stop forming a projection on the fixed shaft between said springs, and a cylindrical part rotatably mounted around said ring.

ANDRÉ VICTOR LÉON
CLÉMENT DEBRIE.

REFERENCES CITED

The following references are of record in the file of this patent:

UNITED STATES PATENTS

| Number | Name | Date |
|---|---|---|
| 732,751 | Krezdorn | July 7, 1903 |
| 993,858 | Maurer | May 30, 1911 |
| 1,072,716 | Hart | Sept. 9, 1913 |
| 1,189,611 | Morse | July 4, 1916 |
| 1,314,178 | Wood | Aug. 26, 1919 |
| 2,082,456 | Liedtke et al. | June 1, 1937 |
| 2,246,456 | Quigley | June 17, 1941 |
| 2,296,753 | Wilton | Sept. 22, 1942 |
| 2,442,400 | Collins | June 1, 1948 |

FOREIGN PATENTS

| Number | Country | Date |
|---|---|---|
| 382,357 | Great Britain | Oct. 27, 1932 |
| 150,388 | Austria | Aug. 10, 1937 |